Oct. 26, 1943.   J. S. WALLIS ET AL   2,333,077
FURNACE CONSTRUCTION
Filed Oct. 19, 1942   2 Sheets-Sheet 2

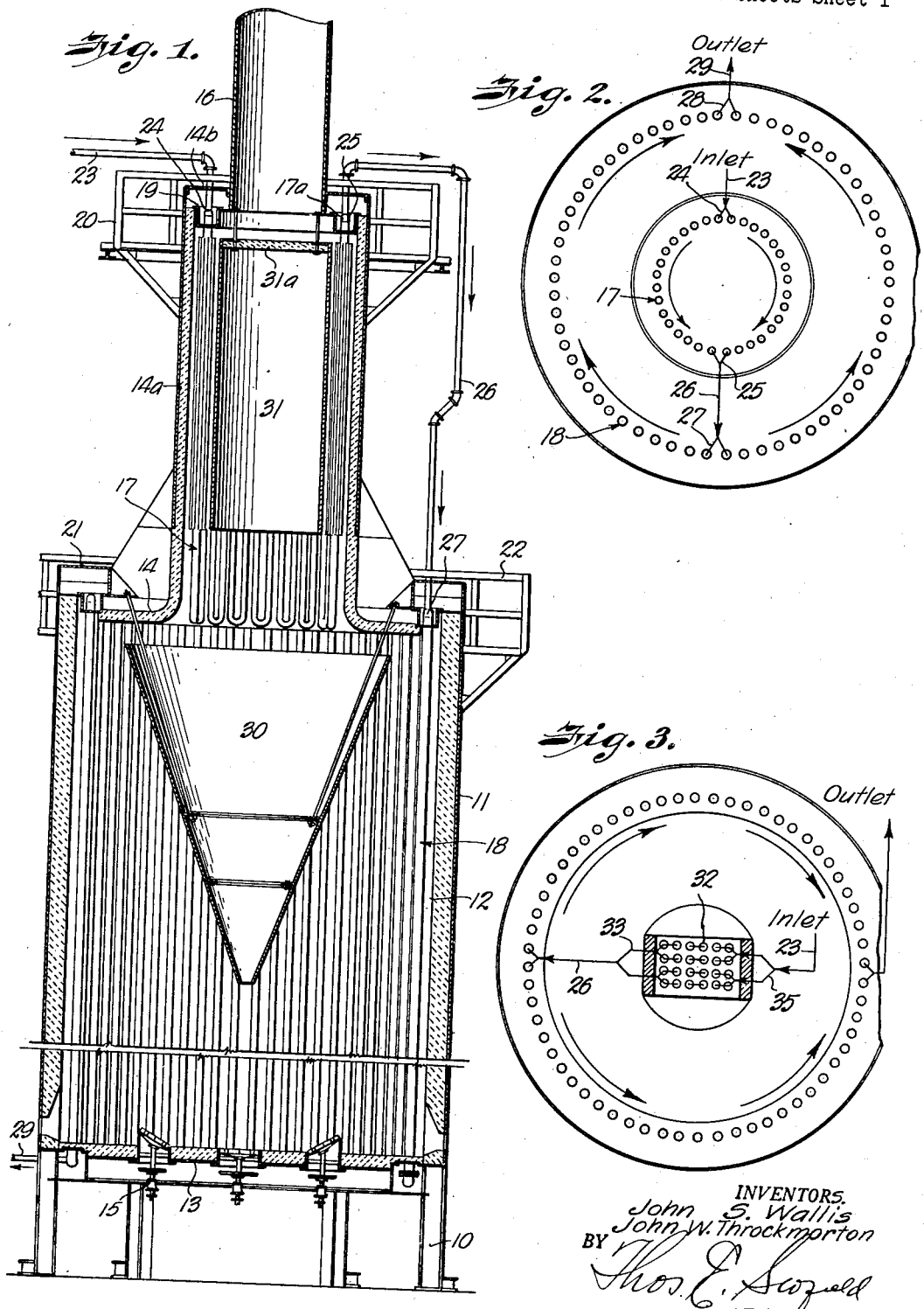

INVENTORS.
John S. Wallis
John W. Throckmorton
BY
ATTORNEY.

Patented Oct. 26, 1943

2,333,077

UNITED STATES PATENT OFFICE 2,333,077

FURNACE CONSTRUCTION

John S. Wallis, Darien, and John W. Throckmorton, Wilton, Conn., assignors to Petro-Chem Development Company, New York, N. Y., a corporation of Delaware Application October 19, 1942, Serial No. 462,579

7 Claims. (Cl. 122—356)

This invention relates to new and useful improvements in furnace construction.

The invention particularly contemplates vertical tubular furnaces of the type used in distillation or cracking of hydrocarbon oils and gases, the heating and vaporization of liquids and gases generally including heating of fluids in chemical processes, industrial methods and the generation of steam. The principal or major part of the heating in furnaces of this type is accomplished in the radiant zone where a bank of vertical heat exchange tubes is located. These tubes designated for convenience as the radiant section, form a continuous passage for fluid to be heated. Heating gases are supplied to the radiant zone by burners arranged below or near the bottom of the tubes to distribute the heat uniformly thereover. These burners located at or adjacent the bottom of the tubes in a combustion chamber produce the combustion gases which rise vertically, circulating around the tubes and passing out via an annular passageway hereinafter referred to as the convection zone and to a stack or flue passage opening in the top of the furnace. The bank of heating tubes in the radiant zone is subjected primarily to radiant heat and a relatively small amount of convection heat. A conical baffle is provided in the top of the radiant zone for reradiating the heat outwardly and downwardly toward the tubes surrounding the zone. That section of the furnace above the radiating baffle, hereinafter referred to as the convection zone, is subjected principally to convection heat and to little or no radiant heat. By the time the combustion gases have passed through the radiant and convection zones, they have lost a considerable part of their heat. In some instances, however, sufficient heat may remain to justify its recovery. This residual heat would normally pass into the stack and be lost unless additional heat exchange surface is provided in the stack or outlet flue in the form of a preheater, or heat exchanger.

Figure 4:
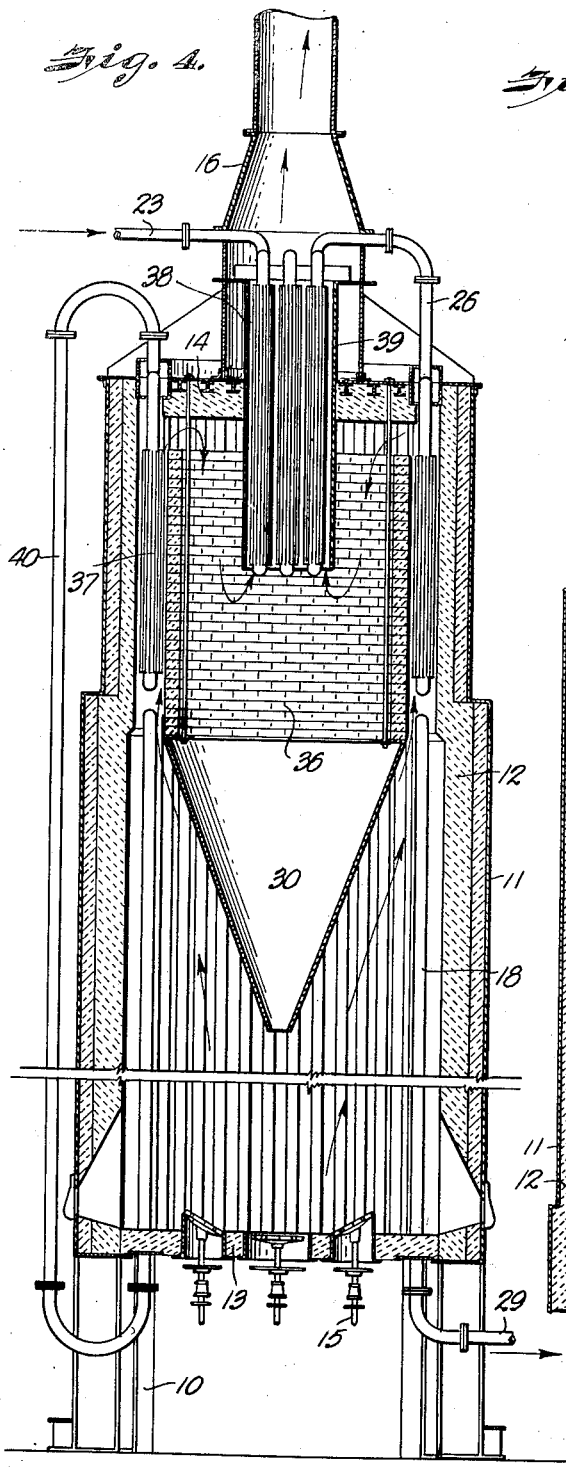

The fluid to be heated enters the furnace in an unheated condition and passes first through portions of the furnace subjected to less intense heat than the radiant zone. For example, the fluid may pass through a preheater in the stack, thence to the convection zone and finally to the radiant zone as shown in Fig. 4. The preheater may be dispensed with in favor of an enlarged convection section as shown in Fig. 1 or a small preheater located in the flue may adequately respond to the duty required when combined with a bank of heat exchange tubes, the upper portions of which are exposed to convection heat and the lower portions to principally radiant heat as in Fig. 5.

In order that the furnace operate with maximum efficiency, it is desirable to absorb as much of the heat as possible in the passage through the furnace.

The instant invention embodies a vertical tubular or cylindrical furnace construction, wherein the banks of tubes are arranged to efficiently absorb the heat from the combustion gases. Two or more interconnected banks of substantially vertical heat exchange tubes are arranged one above the other in the furnace. As the fluid progressively moves from the convection bank of tubes to the radiant bank of tubes, it will continue to absorb heat and by the time it has passed through the radiant zone, it will have been heated to the desired outlet temperature.

Attention is directed to the fact that the tubes of the respective banks are arranged vertically within the preheating, convection and radiant zones. This arrangement permits the use of longer straight tubes and the use of fewer return bends, resulting in a lower pressure drop between the fluid inlet and discharge ports than where the tubes are arranged spirally or horizontally.

An important object of our invention is the provision of a tubular furnace construction wherein the heat exchange tubes are arranged to obtain a maximum heat transfer from the combustion gases to the fluid within the tubes.

Another object of our invention is to provide a tubular furnace that is constructed so that the heat exchange tubes may be easily and expeditiously removed for cleaning, repair or replacement.

Still another object of the invention is the provision of an upright tubular furnace of the above mentioned character that is susceptible of substantially complete shop fabrication and assembly, thus eliminating foundations, erection costs, and considerable weight.

Other objects and advantages of my invention will be apparent during the course of the following description.

In the drawing forming a part of this specification and wherein like numerals are employed to designate like parts throughout the same, Fig. 1 is a vertical sectional view of a tubular furnace embodying the invention, Fig. 2 is a flow diagram illustrating the manner in which the fluid traverses the banks of heat exchange tubes in the furnace shown in Fig. 1, Fig. 3 is a flow diagram illustrating the manner in which fluid traverses the heat exchange tubes of a modified form of furnace construction.

Figure 5:
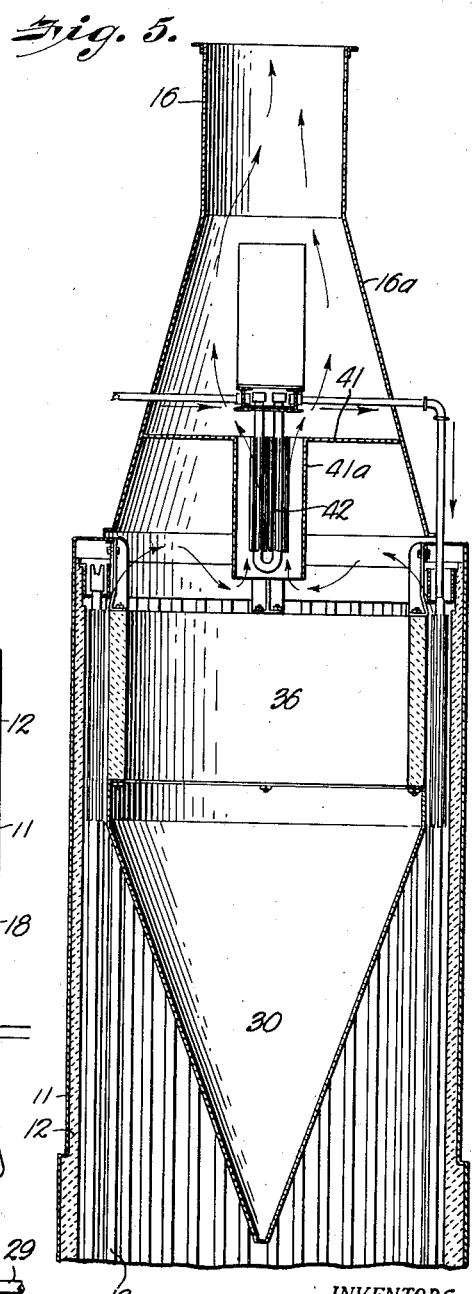

Fig. 4 is a vertical sectional view of still another modification of the invention, and Fig. 5 is a vertical sectional view of still another modification of the invention.

Referring first to Figs. 1 and 2, wherein is shown one form of the invention, the furnace is mounted on a supporting framework 10 and comprises a cylindrical casing 11 of sheet metal lined with a refractory material 12. The bottom of the casing is closed by a wall 13 and the top is closed by a wall 14. Both the bottom and top of the furnace are lined with refractory material. The space within the casing 11 we have chosen to designate as the radiant zone.

Combustion gases are supplied to the radiant zone by directional burners 15 which project through the bottom 13 of the furnace. Each of the burners is movable about a vertical axis and may be adjusted to distribute heat uniformly over the tubes in the radiant section. The combustion gases rise vertically and exhaust through a stack or flue passage 16.

The top 14 has an upstanding neck 14a of substantially lesser diameter than casing 11 but of slightly greater diameter than the stack 16. The neck 14a has an inner lining of refractory material, surrounded by an outer sheath of sheet metal. The sheath has a removable top 14b which snugly fits the lower end of stack 16. This portion of the furnace is the convection zone being heated primarily with convection heat, the tube bank 17 in this zone serving as a preheater. This circular bank of vertical heat exchange tubes 17 is mounted within and adjacent the inner wall of neck 14a and a circular bank of substantially vertical heat exchange tubes 18 is mounted within and adjacent the inner wall of casing 11.

The bank of tubes 17 comprises U-shaped units, the lower ends of the tubes being positioned adjacent the top 14 of the radiant zone and the upper ends supported by brackets 19 adjacent the top of neck 14a. The upper ends of the tubes are connected by removable return bend headers 17a. This arrangement permits easy removal of the heat exchange tubes 17 when cleaning or repair is necessary. To remove the tubes, the top enclosure 14b is taken off and return bend headers 17a disconnected. The units may then be lifted vertically by workmen on platform 20.

The lower bank of heat exchange tubes 18 is similarly removed from above as the bank of heat exchange tubes 17. Return bends at the bottoms of the tubes, as well as the return bends at the tops of the tubes are removable to facilitate cleaning or replacement of the tubes. To remove any or all of the lower bank of tubes 18, it is only necessary to remove cover 21 and disconnect the appropriate upper and lower return bend headers. The tubes may then easily be removed by workmen on platform 22.

Fluid to be heated is introduced into the upper bank of heat exchange tubes 17 through an inlet pipe 23. A Y-fitting 24 connects pipe 23 with an adjacent pair of tubes 17. As shown by the diagram in Fig. 2, fluid introduced into one of the tubes 17 flows to the right around neck 14a and fluid introduced into the other tube flows to the left around neck 14a. After the fluid has passed around the neck, it is discharged into a Y-fitting 25 and thence into a pipe 26 which conducts it to a Y-fitting 27 connected to an adjacent pair of the tubes 18. As described above, the fluid divides, part of it flowing to the right and part to the left around the radiant zone. After the fluid has passed around the radiant zone, it is discharged into a Y-fitting 28 and conducted from the furnace through outlet pipe 29. Thus, the fluid to be heated will flow first through the convection zone, there absorbing convection heat and finally passing through the tubes in the radiant zone where it is subjected principally to radiant heat.

Suspended adjacent the upper portion of the radiant zone is a reradiating cone 30. As the combustion gases rise they are deflected by the cone outwardly against the bank of heat exchange tubes 18 and into the restricted passage between the radiant and convection zones. A tubular sleeve or baffle 31 in the convection zone forms an annular space with the inner wall of the neck, in which space tubes 17 are located and through which the heating gases pass. The baffle 31 has a closed upper end 31a so that the combustion gases must pass through this annular space and over the heat exchange tubes before entering stack 16. The portions of tubes 17 in the annular space preferably have radial fins extending lengthwise thereof, which provide extended surface and increased heat absorption. It will be observed, however, that the heating gases pass directly from the radiant zone into the annular space and from the annular space into the stack 16. Thus, the construction described avoids circuitous, interconnecting ducts providing a low pressure drop and eliminating the necessity for forced draft fans or induced draft devices and their accompanying equipment and attendant expense.

Instead of using a circular bank of heat exchange tubes in the preheating zone, the modified tube arrangement shown in Fig. 3 may be used. In Fig. 3, baffle 31 is omitted and in place of the circular bank of heat exchange tubes 17, a plurality of rows of vertical tubes 32 is provided. The tubes of each row are interconnected to provide a continuous passage therethrough. Manifold connections 33, shown diagrammatically, are connected to the tubes at the ends of the rows so that fluid introduced through pipe 23 divides and flows simultaneously through each row of the tubes. The fluid discharged from the tubes in the manifold 33 is conducted by the single pipe 26 to the lower bank of heat exchange tubes 18. Tubes 32 may be plain surfaces or they may be provided with radial fins, as desired.

In Fig. 4 is illustrated a three-stage furnace construction that may be used where high efficiency is of prime importance. In the furnace construction illustrated in Fig. 4, neck 14a is enlarged to substantially the same diameter as the radiant zone. The bank of tubes 18 again terminates adjacent the top of the radiant zone. Supported above cone 30 within the furnace is a circular wall 36 of refractory material corresponding in diameter with the base of the cone baffle. The wall 36 is concentric with and spaced slightly from the inner wall of the furnace and forms an annular space in which an intermediate circular bank of vertical tubes 37 is positioned. As previously described, the portion of the furnace above cone 30 receives principally convection heat. Therefore, the bank of tubes 37 is located in a convection zone. These tubes are provided with radial fins to increase heat absorption from the convection gases.

A third bank of substantially vertical heat exchange tubes 38 is mounted within a sleeve 39 suspended partly within stack 16 and partly within the convection zone of the furnace. The space within sleeve 39 comprises a preheater zone. Sleeve 39 directs the combustion gases from the annular space around the heat exchange tubes 38.

Fluid to be heated is introduced through inlet pipe 23 into tubes 38 comprising the preheater, thence through pipe 26 connecting to the intermediate bank of heat exchange tubes 37 in the convection zone and finally through pipe 40 to the lowermost bank of heat exchange tubes 18 in the radiant zone. The bank of heat exchange tubes 38 may be either arranged in a circle as shown in Figs. 1 and 2 or in rows as shown in Fig. 3, and the tubes are preferably provided with radial vanes to increase heat absorption. Since tubes 38 are always filled with liquid cooler than the surrounding gases, they will absorb heat remaining in the flue gases. Combustion gases of substantially higher temperature, will contact the convection section of tubes 37 where the heat transfer will be substantially greater. The greatest amount of heat will be transferred in the lower radiant section of the combustion chamber as the liquid passes through the bank of heat exchange tubes 18. This bank of tubes is subjected to the radiant heat of the combustion gases as well as radiated heat from cone 30 and a limited amount of convection heat. As the liquid traverses tubes 18, it is heated to the desired temperature and discharged through pipe 29. There are no ducts between burners 15 and stack 16 that are sufficiently tortuous or restricted to effect a substantnal pressure drop in the furnace. In this construction, the use of vertical heat exchange tubes reduces the pressure drop. Furthermore, the features permitting prefabrication and saving in construction costs and material have been maintained.

In the modification shown in Fig. 5, the separate bank of tubes in the convection zone is omitted. The lower bank of tubes 18 extends up through the convection zone. A novel stack economizer is substituted for the bank of tubes 38. The stack 16 is provided with a frustoconical lower portion 16a having a base of substantially the same diameter as the furnace. The base of the stack is fastened directly to the top of the furnace and slightly above the base is provided a transverse wall 41. A plurality of rows of heat exchange tubes 42 supported within the lower portion of the stack extend downwardly into a well 41a in the wall 41. The well 41a has an open bottom so that combustion gases passing from the annular space between the wall 36 and the inner wall of the combustion chamber may pass through the well on their way to the stack 16. Thus, all of the discharging gases must pass through the well and around the heat exchange tubes 42; also, the space within the well 41a comprises a preheating zone. The fluids to be heated first pass through the bank of tubes 42 so that the relatively cool fluid absorbs the residual heat remaining in the flue gases. It is to be understood that the stack economizer may be of the type shown in either Figs. 2, 3, or 4.

The features of the furnaces shown in the accompanying drawings are particularly applicable to conditions where the inlet temperature is low (100° to 500° F.) and the outlet temperature is high (1000° to 1500° F.). To obtain the maximum efficiency under such conditions, it is desirable to have a convection section to absorb the maximum amount of heat from the flue gas at a relatively low temperature, so that the temperature of the exit flue gas from the convection section is considerably below the normal or conventional temperatures from the convection section of furnaces of this type.

As a typical example, the following temperatures are given to show the distribution of heat through the radiant section and the convection section. Based on a fluid inlet temperature of 300° F. and a fluid outlet temperature of 1500° F. with the normal design of vertical tube furnaces, the fluid enters one bank of tubes and flows progressively to the outlet and the average fluid temperature in the heating elements would be 900° F. Obviously, the flue gas cannot be reduced below the average fluid temperature and would probably be in the order of 1100° F.

If, however, the heating surface is divided so that the flue gas leaves the radiant zone and flows into a separate convection section, the heat distribution would be as follows:

|  | Degrees |
|---|---|
| Inlet to convection section | 300 |
| Outlet from convection section | 700 |
| Inlet to radiant section | 700 |
| Furnace outlet | 1,500 |

Obviously, the average fluid temperature in the convection section (this is a section subject to the flue gas leaving the radiant zone) is 500° F. and the exit flue gas temperature would be reduced to approximately 700° F. With this design, it is obvious that the flue gas temperature has been reduced from 1100° to 700° F., giving a considerably higher efficiency with the independent convection section.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, we claim:

1. A furnace construction including a surrounding wall of refractory material having a lower radiant zone and an upper convection zone, a circular bank of substantially vertical heat exchange tubes in the radiant zone, burners projecting combustion gases around said tubes, another circular bank of substantially vertical heat exchange tubes in the convection zone, tubular means connecting the banks of heat exchange tubes, a reradiating cone suspended centrally adjacent the top of the radiant zone, a sleeve suspended above the cone, said sleeve spaced from the wall of the convection zone to provide an annular space through which the second mentioned tubes pass and directing the combustion gases around the tubes, a fluid inlet for the bank of tubes in the upper zone, and a fluid outlet for the bank of tubes in the lower zone, the arrangement being such that fluid entering the furnace through the fluid inlet progressively traverses the banks of tubes from the top to the bottom of the furnace and then discharges through the fluid outlet.

2. A furnace construction including a surrounding wall of refractory material having a lower radiant zone and an upper convection zone, a circular bank of substantially vertical heat exchange tubes in the radiant zone, burners arranged to project combustion gases around the tubes, another circular bank of substantially vertical heat exchange tubes in the convection zone, tubular means connecting the banks of heat exchange tubes, a reradiating cone suspended centrally adjacent the top of the radiant zone, a sleeve having a closed top suspended above the cone and spaced from the wall of the convection zone to provide an annular space through which the upper bank of tubes pass, radial fins on the portions of the tubes passing through said annular space providing extended surfaces for increasing heat absorption, a fluid inlet for the tubes in the upper zone, and a fluid outlet for the tubes in the lower zone, the arrangement being such that fluid entering the furnace through the fluid inlet will progressively traverse the banks of tubes from the top to the bottom of the furnace and discharge through the fluid outlet.

3. A furnace construction including a surrounding wall of refractory material having a lower radiant zone and an upper convection zone, said convection zone being of substantially lesser diameter than the radiant zone, a circular bank of substantially vertical heat exchange tubes in the radiant zone, burners arranged to project combustion gases around the tubes, a circular bank of substantially vertical heat exchange tubes in the convection zone, tubular means connecting the upper and lower banks of tubes, a reradiating cone suspended centrally adjacent the top of the radiant zone, a sleeve having a closed top suspended above the cone and spaced from the wall of the convection zone to provide an annular space through which the upper bank of tubes pass, radial fins on the tubes passing through the annular space providing extended surfaces for increasing heat absorption, a fluid inlet for the tubes in the upper zone and a fluid outlet for the bank of tubes in the lower zone.

4. A furnace construction including a surrounding wall of refractory material having a lower radiant one, a convection zone above the radiant zone and a preheating zone above the convection zone, burners for projecting combustion gases into the radiant zone, a flue passage for exhausting combustion gases from the furnace, a reradiating member suspended at the top of the radiant zone, a bank of substantially vertical heat exchange tubes in the radiant zone, a bank of substantially vertical heat exchange tubes in the convection zone, a bank of substantially vertical heat exchange tubes in the preheating zone, pipe means seriately connecting said banks of tubes, a fluid inlet for the bank of tubes in the upper preheating zone, and a fluid outlet for the bank of tubes in the lower radiant section, the arrangement being such that the combustion gases pass progressively through the radiant convection and preheating zones and fluid to be heated passes progressively through the preheating convection and radiant zones.

5. A furnace construction including a surrounding wall of refractory material having a lower radiant zone and an upper convection zone, burners arranged to project combustion gases into the radiant zone, a flue passage opening through the top of the convection zone, a reradiating member suspended adjacent the top of the radiant zone, a first bank of substantially vertical heat exchange tubes in the radiant zone, a second bank of substantially vertical heat exchange tubes in the convection zone, a third bank of substantially vertical heat exchange tubes arranged partly within the convection zone and partly within the flue passage, a tubular baffle surrounding said third bank of tubes directing the exhausting combustion gases around the tubes, pipe means seriately connecting the banks of tubes, a fluid inlet for the said third bank of tubes and a fluid outlet for the bank of tubes in the lower radiant section, the arrangement being such that fluid to be heated first flows through the third bank of tubes then through the second bank of tubes and then through the first bank of tubes.

6. A furnace construction including a surrounding wall of refractory material having a lower radiant zone and an upper convection zone, burners arranged to project combustion gases into the radiant zone, a flue passage for exhausting combustion gases surmounting said wall and having a preheating zone, a sleeve of refractory material spaced from the wall of the convection zone, a bank of substantially vertical heat exchange tubes in the radiant zone, the upper ends of said tubes projecting into the convection zone and around said sleeve, a reradiating member suspended at the top of the radiant zone to deflect combustion gases around the sleeve, a bank of heat exchange tubes in the preheating zone of the flue passage, a baffle for directing the exhausting combustion gases about the last mentioned bank of tubes, pipe means connecting the banks of tubes, a fluid inlet for the last mentioned bank of tubes, and a fluid outlet for the first mentioned bank of tubes.

7. A furnace construction including a surrounding wall of refractory material having radiant and convection zones separated by a baffle, a source of combustion gases supplying heat to the radiant zone, a flue passage for exhausting the combustion gases from the convection zone, a connecting passageway between the radiant and convection zones, a bank of plain surfaced tubes in the radiant zone, a bank of tubes having extended surfaces in the convection zone, a third bank of tubes comprising a preheater having extended surface located in the flue, an inlet to the preheater bank, an outlet from the radiant bank and connections between the three banks of tubes whereby fluid introduced to the preheater passes successively through the preheater, the convection bank and the radiant bank.

JOHN S. WALLIS.
JOHN W. THROCKMORTON.